(12) United States Patent
Chen

(10) Patent No.: US 7,442,468 B2
(45) Date of Patent: Oct. 28, 2008

(54) SECONDARY BATTERY WITH IMPROVED ENERGY DENSITY

(75) Inventor: Ga-Lane Chen, Fremont, CA (US)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 545 days.

(21) Appl. No.: 10/901,286

(22) Filed: Jul. 27, 2004

(65) Prior Publication Data

US 2004/0265690 A1 Dec. 30, 2004

(30) Foreign Application Priority Data

Aug. 1, 2003 (TW) ............................... 92121177 A

(51) Int. Cl.
*H01M 4/02* (2006.01)
*H01M 10/04* (2006.01)

(52) U.S. Cl. ...................... 429/209; 429/162
(58) Field of Classification Search ................. 429/162, 429/209
See application file for complete search history.

(56) References Cited

U.S. PATENT DOCUMENTS 4,135,040 A * 1/1979 Thornton ................. 429/104
4,975,344 A * 12/1990 Wedlake et al. ........... 429/103
5,674,644 A   10/1997 Nazri ...................... 429/224
5,888,670 A    3/1999 Kawakami .............. 429/231.4
5,981,107 A   11/1999 Hamano et al. ........ 429/231.95
2003/0099884 A1* 5/2003 Chiang et al. ............... 429/233

FOREIGN PATENT DOCUMENTS

JP         62165875 A  *  7/1987
JP         01132064 A  *  5/1989

* cited by examiner

*Primary Examiner*—Gregg Cantelmo
(74) *Attorney, Agent, or Firm*—Morris Manning Martin LLP; Tim Tingkang Xia, Esq.

(57) ABSTRACT

A secondary battery includes a cathode electrode (10), an anode electrode (10'), and a separator (12) sandwiched between the cathode electrode and the anode electrode. The cathode electrode and the anode electrode each have a regular repeating non-curved inner surface (102) facing the separator, the inner surface defining a multi-stepped structure or a saw-tooth-profile structure thereat. The non-curved surface enlarges a reactive surface area of the cathode electrode and the anode electrode. Accordingly, an energy density of the battery is improved. A method for making the battery includes: providing an anode electrode and a cathode electrode each having a surface facing the other; and forming a regular, repeating non-curved surface on each of the surfaces by way of photolithography.

3 Claims, 4 Drawing Sheets

SECONDARY BATTERY WITH IMPROVED ENERGY DENSITY

BACKGROUND OF THE INVENTION

1. Field of the Invention

The present invention relates to a secondary battery having a separator sandwiched between an anode electrode and a cathode electrode, and more particularly to a secondary battery having increased active surface areas for improved energy density and high battery capacity.

2. Description of the Prior Art

Batteries are commonly used in a variety of applications for conversion of chemical energy into electrical energy. Batteries can be roughly categorized into electro-chemical batteries, fuel cells and solar batteries. Electro-chemical batteries can be sub-categorized into primary batteries and secondary batteries (rechargeable batteries). In recent years, secondary batteries such as lithium ion batteries and nickel metal hydride (NiMH) batteries have been in great demand. This is due to characteristics such as their high voltage, high capacity, and portability. These characteristics make secondary batteries especially suitable for use in electrical applications such as notebook computers, digital cameras, MP3 (Moving Picture Experts Group, audio layer 3) players, and mobile phones.

Generally, a secondary battery includes an anode electrode, a cathode electrode, an ion conducting separator sandwiched between the two electrodes, and an electrolyte. A good example is the lithium ion battery, which has been in commercial use since about 1991 and which has become even more popular in recent times. In the lithium ion battery, a powder of lithium-cobalt oxide ($LiCoO_2$), lithium-nickel oxide ($LiNiO_2$), lithium-manganese oxide ($LiMn_2O_4$) or a like cathode active material is mixed with a binder resin and coated on an aluminum plate, which is thus used as the cathode electrode. A powder of carbonaceous active material such as graphite, coke, meso-carbon micro beads, or carbon nanotubes is mixed with a binder resin and coated on a copper plate, which is thus used as the anode electrode. A porous film such as polyethylene, polypropylene or the like is sandwiched between the anode electrode and the cathode electrode, and is used as the ion conducting separator. A non-aqueous solution containing lithium ions is used as the electrolyte.

In order to satisfy the ongoing demand for miniaturization of the aforementioned electrical devices, it is essential to improve the performance of secondary batteries. The energy density of a secondary battery is one of the most important criteria used to evaluate the performance of the secondary battery. A higher energy density means a higher capacity per volume, and a longer continuous working lifetime per recharge. This enables the battery to have a higher capacity and/or a smaller size.

Generally, there are two approaches to increasing the energy density of secondary batteries. The first approach is to develop new active materials for electrodes which have a higher energy capacity. For instance, in a lithium ion battery, employing carbon nanotubes as the cathode active material provides a much higher capacity of lithium ions compared to employing graphite carbon as the cathode active material. However, research activities needed to develop such new materials need much time and money. The second approach is to increase a reactive surface area of the electrodes. For instance, in a certain type of lithium ion battery, the anode electrode and the cathode electrode may be coiled in a spiral shape or overlapped in a parallel relationship, and duly accommodated in a metallic case made from stainless steel or the like. Alternatively, more layers of the anode electrode and the cathode electrode may be employed. However, this latter solution results in an unduly bulky and heavy battery, and is at odds with the demand for miniaturization. Hence, a secondary battery that overcomes the above-described problems and improves on the prior art is desired.

SUMMARY OF THE INVENTION

Accordingly, an object of the present invention is to provide a secondary battery having improved energy density without adding to the bulk or weight of the battery.

Another object of the present invention is to provide a method for making the above-described secondary battery.

In order to achieve the first object set out above, a preferred secondary battery in accordance with the present invention comprises an anode electrode, a cathode electrode, and a separator sandwiched between the anode electrode and the cathode electrode. Each of said anode electrode and said cathode electrode has a regular, repeating non-curved surface facing the separator.

In a first embodiment of the present invention, the non-curved surface defines a regular, repeating multi-stepped structure thereat. The multi-stepped structure comprises a plurality of regular repeating sets of steps, each set of steps comprising a plurality of descending steps or a plurality of ascending steps. Adjacent sets of descending and ascending steps may be symmetrical, or may be nonsymmetrical. A depth of each step is in the range from 1 to 100 nanometers.

In a second embodiment of the present invention, the non-curved surface defines a regular, repeating sawtooth-profile structure thereat. Said sawtooth-profile structure has a plurality of sharp tips and a plurality of v-shaped bottoms arranged alternately. Preferably, a distance between each two neighboring tips is in the range from 1 to 100 nanometers.

In order to achieve the second object set out above, a preferred method for making the secondary battery in accordance with the present invention comprises: providing an anode electrode and a cathode electrode each having a surface facing the other; and forming a regular, repeating non-curved surface on each of the surfaces by way of photolithography. The photolithography for each of the anode electrode and cathode electrode comprises the following steps: forming a first photo resist film on a main surface of the anode/cathode electrode; placing a first mask on the photo resist film, a first resolution of the first mask being R; forming a set of steps on the surface by a first exposure, developing and etching process; forming a second photo resist film on surfaces of the steps; placing a second mask on the second photo resist film, a second resolution of the second mask being 3*R; and performing a second exposure, developing and etching process.

Each of the exposure processes is an ultraviolet radiation exposure process executed by an aligner or a stepper. Alternatively, each of the exposure processes is executed by an electron beam writer. Each of the etching processes is executed by using a photo etching technology or a μ-ray developing technology.

Other objects, advantages and novel features of the present invention will become more apparent from the following detailed description when taken in conjunction with the accompanying drawings, in which:

DETAILED DESCRIPTION OF PREFERRED EMBODIMENTS OF THE INVENTION

Reference will now be made to the drawings to describe the preferred embodiments of the present invention in detail.

Figure 14:
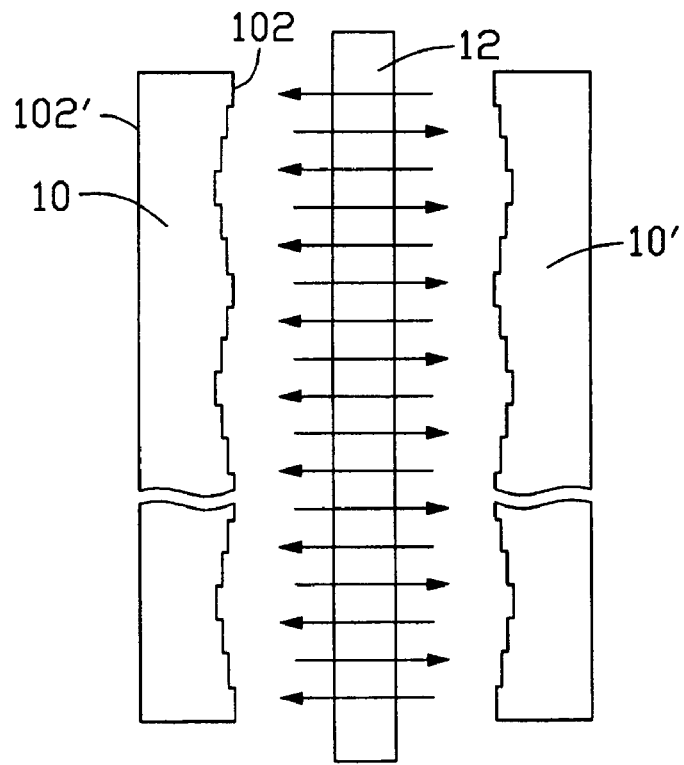
FIG. 14 is a schematic, cross-sectional view of the lithium ion battery in accordance with the first preferred embodiment of the invention.

Referring initially to FIG. 14, a lithium ion battery in accordance with the first preferred embodiment of the present invention comprises a cathode electrode 10 and an anode electrode 10' facing each other. A porous separator 12 is sandwiched between the cathode electrode 10 and the anode electrode 10'. A lithium ion-containing electrolyte (not shown) is filled in the porous separator 12 and spaces between the cathode electrode 10 and the anode electrode 10'.

In this embodiment, the cathode electrode 10 and the anode electrode 10' only have their active layer shown herein, and a collector plate (e.g., a copper plate or an aluminum plate) as known in the art is not shown. A material of the cathode electrode 10 can be lithium-cobalt oxide ($LiCoO_2$), and a material of the anode electrode 10' can be graphitic carbon. Other materials as known in the art are also suitable for the present invention.

Figure 13:
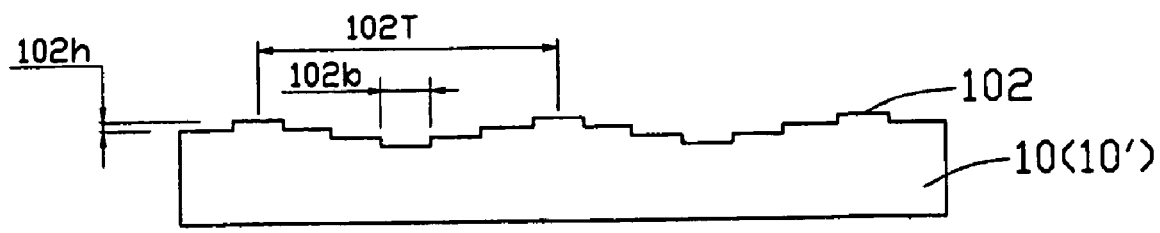
FIG. 13 is similar to FIG. 12, but showing the cathode electrode after residual portions of the second photo-resist film have been removed; that is, showing the completed cathode electrode in accordance with the first preferred embodiment of the present invention.

The cathode electrode 10 and the anode electrode 10' each have an inner surface 102 facing the porous separator 12. Each of the two surfaces 102 has a multi-stepped structure. The multi-stepped structure comprises symmetrically adjacent sets of ascending steps and descending steps. All the steps have substantially identical heights 102h and substantially identical widths 102b. Referring also to FIG. 13, the height 102h of each of the steps is controlled to be less than 100 nanometers. The width 102b of each of the steps is controlled to be in the range from 1 to 100 nanometers. A pitch between identical steps in the multi-stepped structure is defined as 102T. Each set of ascending steps and an adjacent set of descending steps share a common single step where the two sets of steps meet. The common single step is either a topmost step of the two sets of steps, or a bottommost step of the two sets of steps. The steps of each set of ascending steps cooperatively define an oblique ascending direction. The steps of each set of descending steps cooperatively define an oblique descending direction. The oblique ascending direction of each set of ascending steps and the oblique descending direction of an adjacent set of descending steps intersect where the two sets of steps meet. The point of intersection of the oblique ascending direction and the oblique descending direction is either at the shared topmost step of the two sets of steps, or at the shared bottommost step of the two sets of steps. Advantageously, this multi-stepped structure provides the surface 102 with a large amount of reactive surface area. The cathode electrode 10 and the anode electrode 10' each also have an outer surface 102'.

The multi-stepped structure of the electrodes 10, 10' provides a greatly enlarged reactive surface area for the battery without any additional weight or bulk. Because the reactive surface area is increased, much more effective chemical reactions at the electrodes 10, 10' can occur, and an energy density of the battery is increased accordingly.

A preferred method for fabricating the cathode electrode 10 according to the first preferred embodiment of the present invention will be described in detail below with reference to FIGS. 1 to 13. The anode electrode 10' can be fabricated by the same method.

Figure 1:
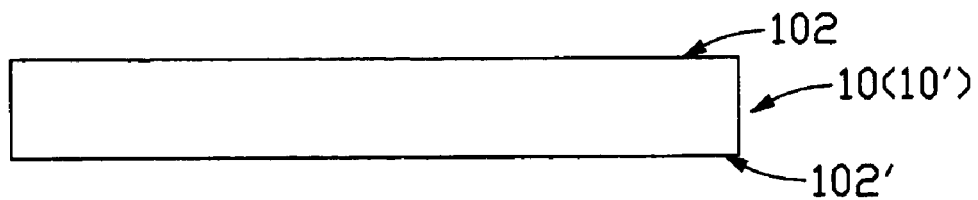
FIG. 1 is a side elevation of a preform of a cathode electrode (hereinafter, "cathode electrode") of a lithium ion battery according to the first preferred embodiment of the present invention.

Referring to FIG. 1, a preform of the cathode electrode 10 is provided. For the sake of convenience, the preform of the cathode electrode 10 will hereinafter simply be referred to as the cathode electrode 10. The cathode electrode 10 has the inner surface 102 and the outer surface 102', both of which are flat. It is emphasized again that the cathode electrode 10 illustrated only shows the active material layer, and a current collector plate is not shown. The outer surface 102' can be connected to a metallic plate (not shown) as the current collector plate. The inner surface 102 can be made smooth and flat by a mechanical polishing process or a chemical polishing process prior to the subsequent steps described below.

Figure 2:
FIG. 2 is a schematic, side cross-sectional view of a first mask used in a first photolithography process for fabricating the cathode electrode according to the first embodiment of the present invention.

Referring to FIG. 2, a first mask 111 having a resolution of 100 lines per millimeter is provided. The first mask 111 has a size identical to that of the inner surface 102 of the cathode electrode 10.

Figure 3:
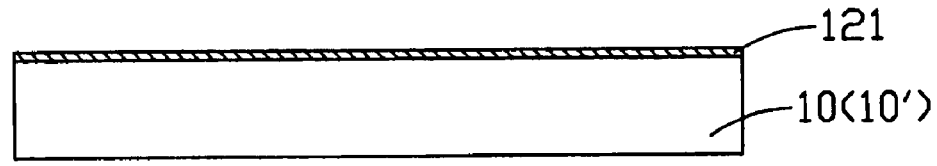
FIG. 3 is similar to FIG. 1, but showing a first photo-resist film formed on the cathode electrode.

Referring to FIG. 3, a first photo-resist film 121 is formed on the inner surface 102 of the cathode electrode 10. The first photo-resist film 121 can be formed by a spin coating process. The first photo-resist film 121 can be a positive photo-resist film or a negative photo-resist film. In this embodiment, a positive photo-resist film is used.

Figure 4:
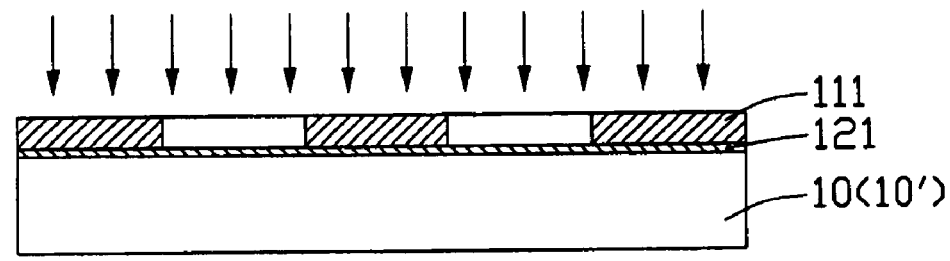
FIG. 4 is similar to FIG. 3, but showing the first mask placed on the first photo-resist film and a first exposure process being performed.

Referring to FIG. 4, the first mask 111 is placed on the first photo-resist film 121, and a first exposure process is performed. The first exposure process can be executed by radiation of ultraviolet light using an aligner (not shown) or a stepper (not shown). Alternatively, the first exposure process can by executed by an electron-beam writer (not shown). It is known that a reaction will occur in portions of the first photo-resist film 121 that are exposed to the ultraviolet light, and that therefore these exposed portions are changed chemically.

Figure 5:
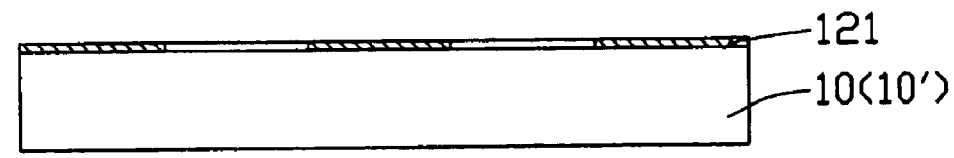
FIG. 5 is similar to FIG. 4, but showing the first photo-resist film changed after a first developing process has been performed.

Referring to FIG. 5, portions of the first photo-resist film 121 that has been exposed to the ultraviolet light in the first exposure process are dissolved and cleaned away. Residual portions of the first photo-resist film 121 are baked, so that they can be used as a mask for a next etching process. It is also known that if the first photo-resist film 121 is a negative photo-resist film, then portions of the first photo-resist film 121 that are unexposed are dissolved and cleaned away. In either case, certain portions of the first photo-resist film 121 are dissolved and removed, so that corresponding portions of the inner surface 102 of the cathode electrode 10 are exposed.

Figure 6:
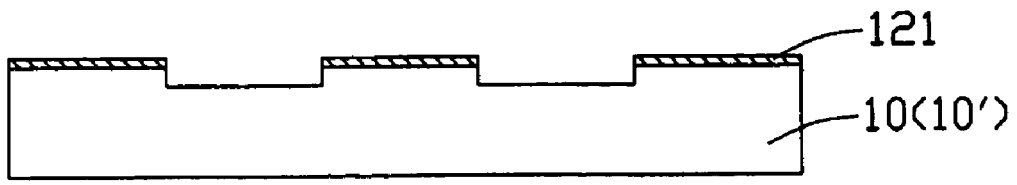
FIG. 6 is similar to FIG. 5, but showing the cathode electrode changed after a first etching process has been performed.

Referring to FIG. 6, the exposed portions of the inner surface 102 are etched by a first etching process. This process can be executed by a photo etching technology or a μ-ray developing technology. In either case, the process is executed under the control of a computer, so that a plurality of steps with a precisely controlled first depth are formed. Remaining portions of the inner surface 102 are protected by the residual portions of the first photo-resist film 121.

Figure 7:
FIG. 7 is similar to FIG. 6, but showing the cathode electrode after residual portions of the first photo-resist film have been removed.

Referring to FIG. 7, the residual portions of the first photo-resist film 121 are dissolved and removed. This can be done by eroding the residual portions of the first photo-resist film 121 using a potassium cyanide solution. Thus, a precursor structure having alternately arranged steps at the inner surface 102 is obtained.

In order to obtain the more complicated multi-stepped structure desired, similar processes to those described above are repeated, as follows.

Figure 8:
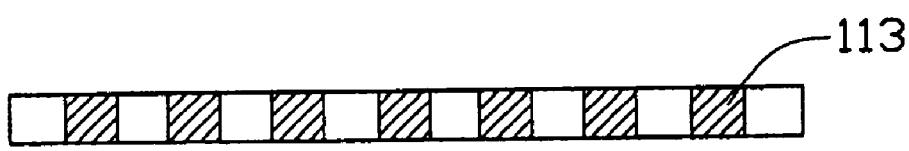
FIG. 8 is a schematic, side cross-sectional view of a second mask used in a second photolithography process for fabricating the cathode electrode according to the first embodiment of the present invention.
Figure 9:
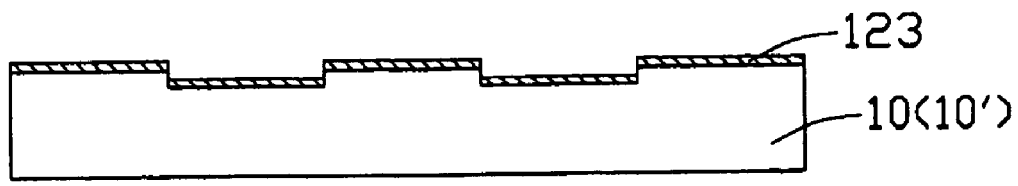
FIG. 9 is similar to FIG. 7, but showing a second photo-resist film formed on the cathode electrode.
Figure 10:
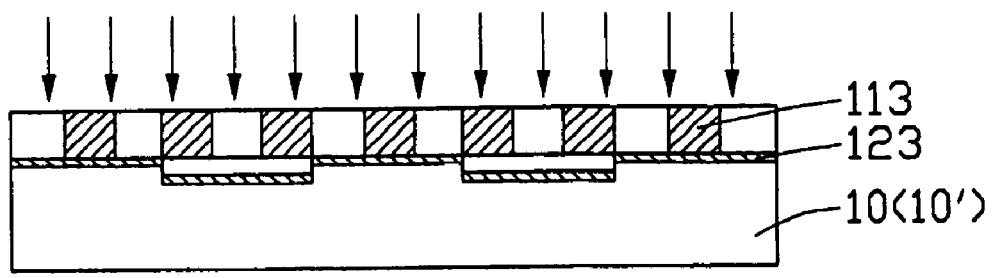
FIG. 10 is similar to FIG. 9, but showing the second mask placed on the second photo-resist film and a second exposure process being performed.
Figure 11:
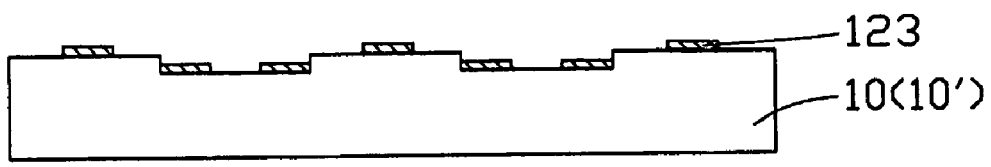
FIG. 11 is similar to FIG. 10, but showing the second photo-resist film changed after a second developing process has been performed.
Figure 12:
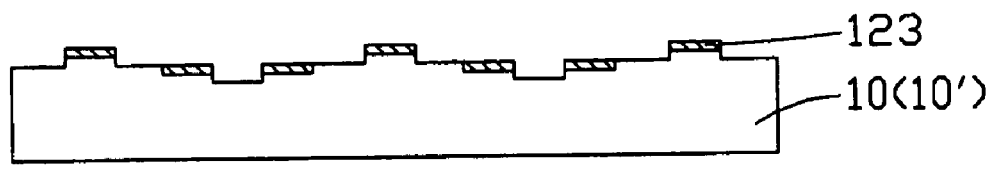
FIG. 12 is similar to FIG. 11, but showing the cathode electrode changed after a second etching process has been performed.

Referring to FIG. 8, a second mask 113 having a resolution of 300 lines per millimeter is prepared. The second mask 113 has a size identical to that of the inner surface 102 of the cathode electrode 10, so that it can cover the inner surface 102.

Referring to FIGS. 9 to 13, another photolithography process similar to the one described above is performed. Using the second mask 113, the process includes forming a second photo-resist film 123 on the inner surface 102, exposing the second photo-resist film 123 with ultraviolet light, dissolving and removing exposed portions of the second photo-resist film 123, etching exposed portions of the inner surface 102, and removing residual portions of the second photo-resist film 123. A second depth of the etching performed is half of the above-described first depth. Thus, the regular multi-stepped structure of the inner surface 102 is obtained. Each set of steps has three steps. That is, each set of ascending steps has a three-step structure, and each set of descending steps has a three-step structure.

It is understood that, in alternative embodiments of the present invention, a nonsymmetrical multi-stepped structure at the inner surface 102 may be obtained. This can be done by using a mask having a resolution different to that of the mask 111 or the mask 113. The nonsymmetrical multi-stepped structure provides benefits similar to those described above in relation to the symmetrical multi-stepped structure.

Figure 15:
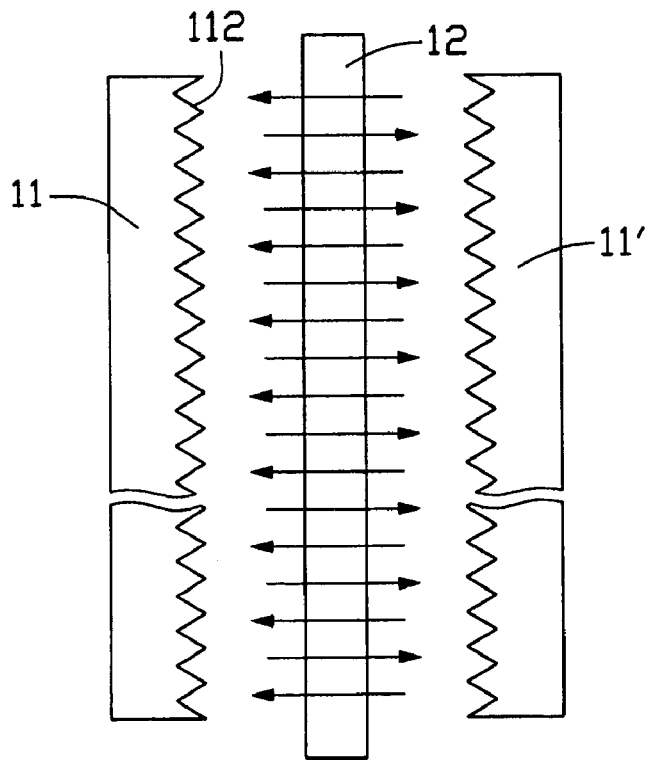
FIG. 15 is a schematic view of a lithium ion battery in accordance with the second preferred embodiment of the present invention.

Referring to FIG. 15, a lithium ion battery according to a second preferred embodiment of the present invention is shown. The lithium ion battery of the second embodiment comprises a cathode electrode 11, an anode electrode 11', and a separator 12 sandwiched between the two electrodes 11, 11'. As explained in relation to the first embodiment, the electrodes 11, 11' illustrated only show the active material thereof. Each of the electrodes 11, 11' has an inner surface 112 facing the separator 12. A zigzag structure (e.g., a sawtooth profile structure)(not labeled) is defined at the inner surface 112. The zigzag structure has a plurality of sharp tips (not labeled) and v-shaped bottoms (not labeled) arranged alternately. A pitch between each two neighboring tips is in the range from 1 to 100 nanometers.

The zigzag structures of the electrodes 11, 11' provide greatly increased reactive surface areas thereof. Therefore, an energy density of the battery is increased accordingly, without increasing the weight or bulk of the battery.

The electrodes 11, 11' having the zigzag structure can be fabricated by a photolithography method similar to the one described above in relation to the lithium ion battery of the first embodiment.

It is noted that the present invention is not limited to lithium ion batteries. Other types of secondary batteries such as lithium polymer batteries and nickel metal hydride batteries are also suitable for application of the present invention.

It is understood that the invention may be embodied in various other forms without departing from the spirit thereof. Thus, the present examples and embodiments are to be considered in all respects as illustrative and not restrictive, and the invention is not to be limited to the details given herein.

The invention claimed is:

1. A secondary battery comprising:
   an anode electrode;
   a cathode electrode opposite to the anode electrode;
   a separator sandwiched between the anode electrode and the cathode electrode; and
   an electrolyte;
   wherein each of said anode electrode and said cathode electrode has a regular, repeating non-curved surface facing the separator, each non-curved surface defines a regular, repeating multi-stepped structure thereat, the multi-stepped structure comprises a plurality of sets of ascending steps and a plurality of sets of descending steps alternately arranged one set next to the other, each set of ascending steps and an adjacent set of descending steps share a common single step where the two sets of steps meet, and the common single step is either a topmost step of the two sets of steps, or a bottommost step of the two sets of steps, and each set of ascending steps and the adjacent set of descending steps are symmetrical with respect to each other.

2. A secondary battery comprising:
   an anode electrode having a first surface;
   a cathode electrode having a second surface; and
   a separator sandwiched between the anode electrode and the cathode electrode;
   wherein at least one of the first and second surfaces defines a plurality of regular, repeating multi-stepped structures thereat, each multi-stepped structure comprises of a set of ascending steps and an adjacent set of descending steps, the set of ascending steps and the set of descending steps are configured symmetrically with respect to each other, the set of ascending steps and the set of descending steps share a common single step where the two sets of steps meet, and the common single step is either a topmost step of the multi-stepped structure, or a bottommost step of the multi-stepped structure.

3. The secondary battery as described in claim 2, wherein the steps of each set of ascending steps cooperatively define an oblique ascending direction, the steps of each set of descending steps cooperatively define an oblique descending direction, and said oblique ascending direction and said oblique descending direction intersect at the common single step.

* * * * *